L. S. STARRETT.
MICROMETER.
APPLICATION FILED JUNE 13, 1916.

1,241,161.

Patented Sept. 25, 1917.

Inventor
Laroy S. Starrett
By
Attorney

UNITED STATES PATENT OFFICE.

LAROY S. STARRETT, OF ATHOL, MASSACHUSETTS.

MICROMETER.

1,241,161.  Specification of Letters Patent.  Patented Sept. 25, 1917.

Application filed June 13, 1916. Serial No. 103,574.

*To all whom it may concern:*

Be it known that I, LAROY S. STARRETT, a citizen of the United States, residing at Athol, county of Worcester, Commonwealth of Massachusetts, have invented certain new and useful Improvements in Micrometers, of which the following is a specification.

This invention relates to micrometers, and particularly to the locking device for holding the spindle of the micrometer in its position of adjustment.

In devices of this kind it is of the utmost importance that the lock be so constructed and operated as not to disturb the accuracy of the spindle setting. Any tendency of the lock in its operation to move the spindle longitudinally is fatal to accuracy. Moreover, since the adjustments of the spindle itself determine the accuracy of the measurements, any strain imparted to it by the operation of the lock, tends to produce play of the spindle in its bearing, and this play, no matter how slight it may be, may in time seriously affect the accuracy of the instrument by throwing it out of alinement.

One object of the present invention is to provide a micrometer spindle lock which will be capable of quick and certain clamping about the circumference of the spindle at the point where it is to be locked, and which will not impart lateral strain or rotative or longitudinal tendency to the spindle by the clamping action of the lock itself. Another object of the present invention is to provide for locking the spindle clamping member of the lock against rotation in its bearing when the actuating member of the lock is rotated. Where a simple set screw has been depended upon to hold the spindle clamping member against rotation there has been a possibility that the rotation of the actuating member of the spindle lock will loosen the set screw, thereby permitting the spindle clamping member to rotate and wearing the contact between the set screw and the said member. This possible tendency is eliminated in the present invention by a construction in which the bushing is rigidly and positively held against rotation, while free to be firmly clamped about the spindle without imparting a rotative or longitudinal tendency thereto.

The construction and operation of my device is fully disclosed in the specification which follows. In the drawings accompanying the specification I have shown an embodiment which has been found satisfactory in actual use and well adapted to commercial production. Throughout the specification and drawings like reference numerals are correspondingly applied, and in the drawings.

Figure 1:
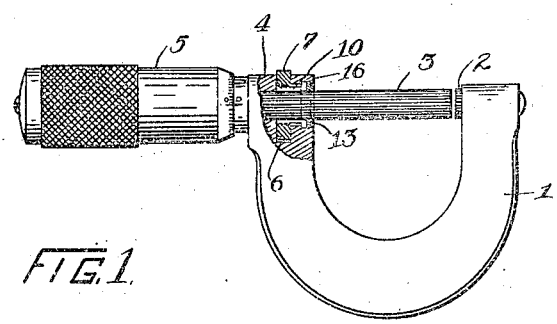
Figure 1 is a side view of a micrometer equipped with a spindle lock in accordance with my invention, the hub being partially broken away to expose the locking device.
Figure 4:
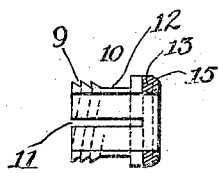
Figs. 4 and 5 are enlarged detail views of the spindle clamping member of my lock removed, Fig. 4 being taken on the line 4—4 of Fig. 5.
Figure 5:
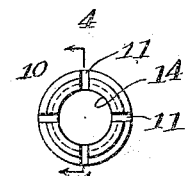
Figure 2:
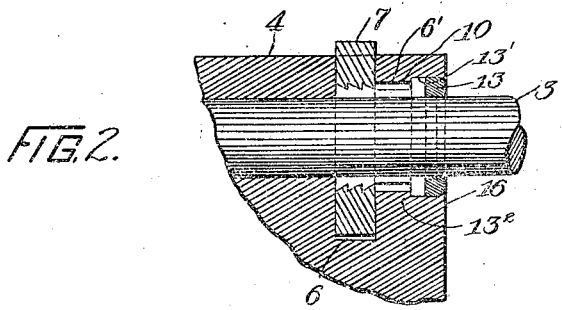
Fig. 2 is an enlarged detail section, particularly illustrating the permanent connection of the spindle clamping bushing with hub.
Figure 3:
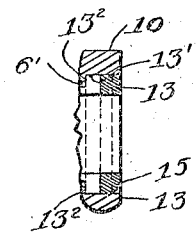
Fig. 3 is a similar enlarged detail section showing the hub and bushing before they are interlocked.
Figure 6:
Fig. 6 is an enlarged detail view of the external member of my lock, removed.

I have indicated at 1 the usual frame of the micrometer having an anvil 2 and a rotatable spindle 3 working through a bearing formed in the usual hub 4 and operated by the usual sleeve 5. The hub 4 is transversely slotted as indicated at 6, to receive the external operating member 7 of the locking device, and longitudinally bored as indicated at $6^1$ to receive the internal spindle clamping member 10 of the locking device. The bore $6^1$ is intersected by a circumferential counter-bore $13^1$ at the outer end 16 of the hub. This counter-bore provides a seat in which the outer end of the head 13 on the member 10 is received with the inner end of said head abutting the internal shoulder $13^2$ formed at the juncture of the bores $6^1$ and $13^1$.

The member 7 has an internal thread 8 of suitable wedge-shape and of convenient pitch, adapted to engage the similar thread 9 of the tubular sleeve or bushing 10. The bushing 10 has a smooth cylindrical spindle clamping bore 14 and is adapted to be compressed by rotation of the nut 7 in one direction whereby to tightly clamp the spindle 3. In order to secure proper flexibility, said bushing is split radially in the direction of its length as indicated at 11, and reduced circumferentially between its ends, as indicated at 12.

The head 13 of the bushing 10 is adapted to be expansibly interlocked with the metal at the end 16 of the hub 4 whereby to positively hold said bushing against movement. In effecting this, the feather edge of the head 13 of the bushing is first removed, leaving a bevel 15, and the bushing then intersected in the bore 6¹ with the beveled end of the head 13 seated in the counter-bore 13¹ and the rear end thereof abutting the internal shoulder 13². The metal at the end 16 of the hub 4 is then upset by a spinning process to cause it to head over and expansibly interlock with the beveled end of the head. This burs or swages the hub solid with the head of the bushing, making the two elements practically integral and positively preventing all tendency for the bushing to move when the actuating member 7 is rotated. Moreover, the head 13 effectively seals the bore 6¹ against ingress of grit and the like.

In the operation of the lock, the threads 8 and 9 slip on one another as the operating nut 7 is rotated in one direction, causing said nut to crowd against the forward wall of the slot through which the member 10 passes. The riding of the threads of the nut on those of the bushing causes an inward crowding of the walls of the longitudinally slit bushing. This contracts the sleeve 10 without rotating it, thereby firmly clamping the spindle without disturbing its adjustment. This compression, by reason of the slits 11 and circumferentially weakened portion 12 is distributed along the spindle 3, and as the compression is taken up between the head 13 and the nut 7 there is no strain on the spindle bearing. The spindle is released by rotating the operating nut 7 in the reverse direction.

The bushing itself is permanently and rigidly held within the hub by the expansible interlock described and so held is practically integral therewith, and cannot be turned by the turning of the actuating nut. It will therefore be seen that my lock enables the spindle to be positively clamped without disturbing the accuracy of its setting, either by imparting longitudinal movement to the spindle or by rotating the bushing itself, and that moreover the spindle is relieved of all undue strain and cannot therefore develop a play capable of affecting the accuracy of the instrument.

Various modifications in the form and construction of my invention may obviously be resorted to if within the limits of the appended claims.

What I therefore claim and desire to secure by Letters Patent is:

1. In a micrometer, a hub having a spindle bearing and a transverse slot intersecting said bearing, a spindle in said bearing, a longitudinally split compressible bushing inclosing said spindle and having a continuous circumferential thread intersecting said split and having a head interlockingly engaged with the adjacent end of the hub to hold the bushing against longitudinal movement in said bearing, and an operating nut held against longitudinal movement in said transverse slot and having a threaded engagement with the thread of the bushing.

2. In a micrometer, a hub having a spindle bearing and a transverse slot intersecting said bearing, a spindle in said bearing, a compressible bushing inclosing said spindle, said bushing split longitudinally at a plurality of places and provided with a short series of continuous circumferential ratchet threads intersecting said splits, and having a head interlockingly engaged with the adjacent end of the hub to hold the bushing against longitudinal movement in said bearing, and an operating nut held against longitudinal movement in said transverse slot and having a ratchet threaded engagement with the ratchet threads of the bushing.

3. In a micrometer, a hub having a bearing, and a transverse slot intersecting said bearing, a spindle in said bearing, a compressible bushing in said bearing inclosing said spindle, said bushing symmetrically split in the direction of its length and weakened radially intermediate its ends, and provided at one end with a short series of continuous circumferential threads intersecting said splits and having its other end interlockingly engaged with the adjacent end of the hub to seal the bearing against ingress of foreign matter and to hold the bushing against longitudinal movement in said bearing, and an operating nut rotatable in said transverse slot and having a threaded engagement with said threads of the bushing.

In testimony whereof I affix my signature in presence of two witnesses.

LAROY S. STARRETT.

Witnesses:
ERNEST W. TAYLOR,
WILLARD G. NIMS.